United States Patent [19]

Hereford

[11] 4,032,805
[45] June 28, 1977

[54] ELECTRICAL PULSE GENERATOR FOR REMOTE READING METER

[75] Inventor: John R. Hereford, New Haven, Mo.

[73] Assignee: Gamon-Calmet Industries, Inc., Florence, Ky.

[22] Filed: Sept. 18, 1975

[21] Appl. No.: 614,369

[52] U.S. Cl. .................................. 310/15; 310/29; 310/36

[51] Int. Cl.² ...................................... H02K 35/00

[58] Field of Search .............................. 310/12–15, 310/29, 32, 36–39

[56] References Cited

UNITED STATES PATENTS

| | | | |
|---|---|---|---|
| 2,135,843 | 11/1938 | Pye | 310/36 |
| 2,491,902 | 12/1949 | Ostline | 310/36 UX |
| 2,536,468 | 1/1951 | Russell | 310/36 X |
| 3,315,104 | 4/1967 | Barr | 310/29 |
| 3,339,093 | 8/1967 | Beers | 310/15 |

Primary Examiner—Donovan F. Duggan
Attorney, Agent, or Firm—Lerner, David, Littenberg & Samuel

[57] ABSTRACT

Electrical pulse generator to operate a remote water meter indicator in which the pulse generator is driven by the drive of the meter to cause a magnetic circuit to be opened and closed in accordance with the rotation of the meter drive. The magnetic circuit is opened and closed in a manner whereby a linear force element, i.e., a spring, is acting against a magnetic gap so that the spring is sufficient to overcome the magnetic force and open the gap to cause a large change in the reluctance of the magnetic circuit, generating a pulse in a coil which can be then used to drive a remote reading meter.

10 Claims, 6 Drawing Figures

U.S. Patent    June 28, 1977    4,032,805
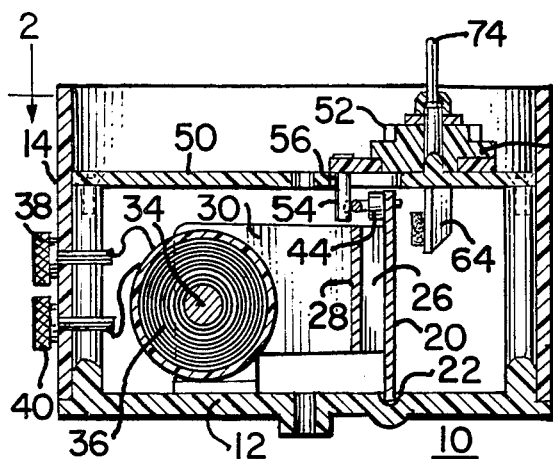
Fig. 1.
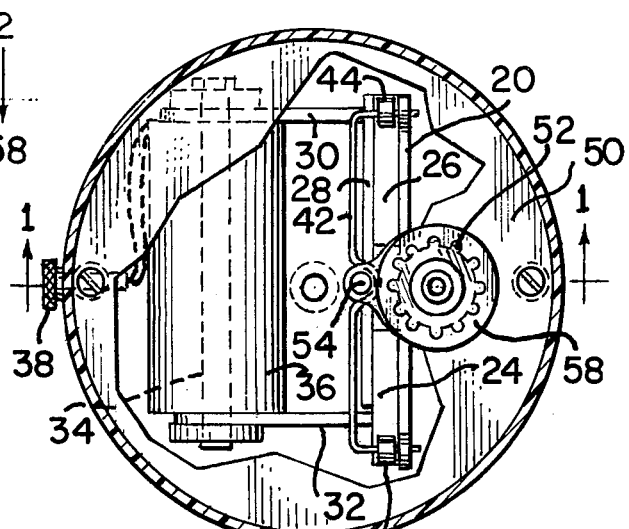
Fig. 2.
Fig. 3.
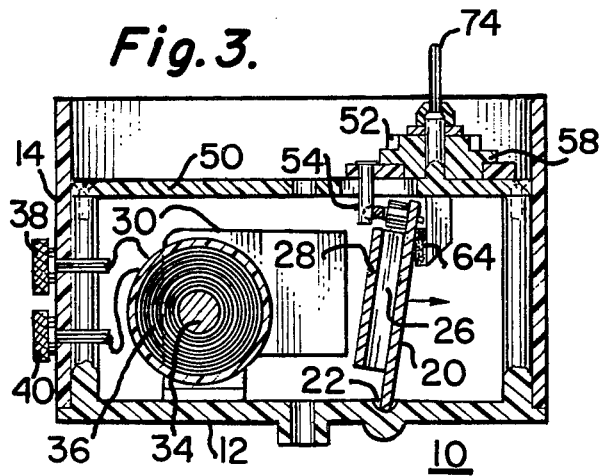
Fig. 4.
Fig. 6.
Fig. 5.
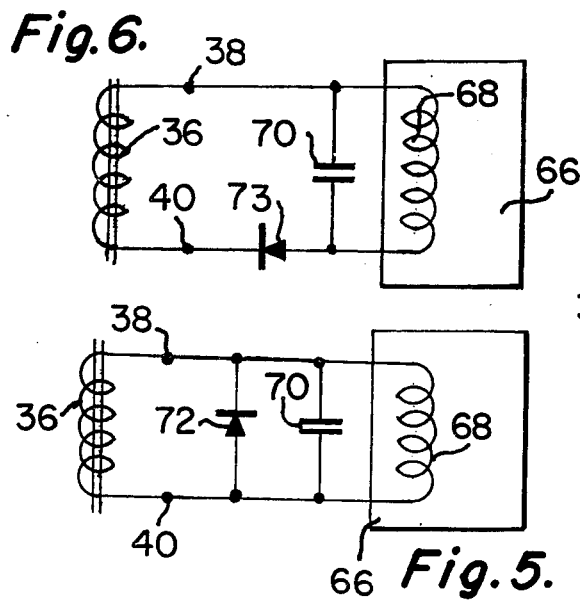
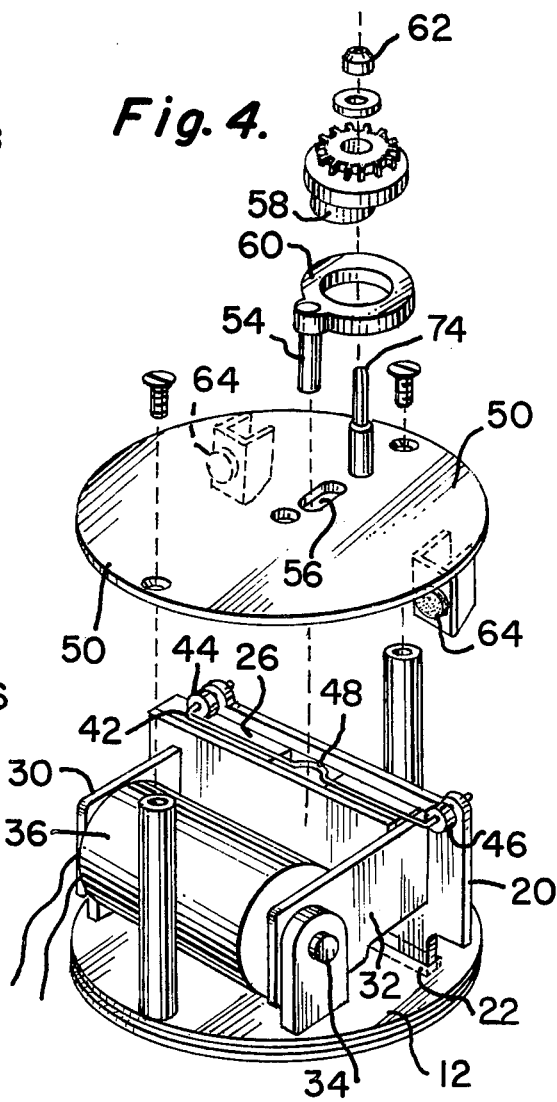

ELECTRICAL PULSE GENERATOR FOR REMOTE READING METER

BACKGROUND OF THE INVENTION

In designing a remote reading meter, it is extremely important to be able to produce an economical, low-power, generator that is positive in operation and will produce reliable results, continuously, over long periods of time of continuous use without wear on parts. Thus, the reliability and economy of the resultant generator is extremely important. Other types of devices in which a spring and a body of magnetic material spaced from a coil have been utilized to provide a pulse upon the pressure of a spring are known in the art, such as that shown in Troesh, U.S. Pat. No. 3,693,033. Similarly, U.S. Pat. Nos. 2,687,481; 3,065,366; 3,116,428; 3,132,268; 3,153,735; and 3,398,302 show similar devices.

However, none of the devices in the past have shown or were capable of continuous operation to produce a pulse synchronized to the rotation of the basic meter so that said pulse could be transmitted to actuate a visual readout device at a remote location.

SUMMARY OF THE INVENTION

The present invention is directed to a pulse generator operative for a water meter in which a crank from the water meter extends a spring until the magnetic force holding a member in place is overcome and then the member moves quickly to a stop. As the member moves in the magnetic field, a pulse is produced. The crank releases the member and the member is magnetically returned to its original position upon its return stroke. Each excursion of the member causes a large change in the reluctance of the magnetic circuit generating a pulse. The magnetic circuit itself is formed from a magnetizable core with ceramic magnets movable to open and close the gap with the magnetizable core. A suitable pick-up winding is wound around the magnetizable core. This produces an extremely lightweight, but efficient device which will produce sharp pulses which can be read by a remote reader.

Although this invention will be described with respect to its preferred embodiments, it should be understood that many variations and modifications will be obvious to those skilled in the art, and it is preferred, therefore, that the scope of the invention be limited, not by the specific disclosure herein but only by the appended claims.

DETAILED DESCRIPTION OF THE DRAWINGS

FIG. 1 is a cross-sectional view of the two-wire generator remote unit of the present invention taken along lines 1—1 of FIG. 2.

FIG. 2 is a cross-sectional view of the present invention taken along lines 2—2 of FIG. 1.

FIG. 3 is a cross-sectional view of the unit similar to that shown in FIG. 1 with the magnetic keeper moved against the stop.

FIG. 4 is an exploded view of the unit of the present invention.

FIG. 5 is a circuit diagram of the operation of the present invention.

FIG. 6 is an alternate circuit diagram for operating the present invention.

In FIG. 1, there is shown a two-wire generator remote unit utilized in accordance with the principles of the present invention and generally designated by the numeral 10. The remote generator 10 includes a bottom plate 12 and a cylindrical side plate 14 integral therewith. The bottom edge of a pivotable magnet pivot plate 20 rests in a slot in the top surface of the bottom plate 12 of the housing. The slot 22 acts as the pivot for rotation of the plate 20 thereabout. The plate 20 has secured thereto a pair of ceramic magnets 24 and 26. The ceramic magnets 24 and 26 are sandwiched between the pivot plate 20 and a magnet plate 28. The magnets 24 and 26 are ceramic magnets which provide the maximum magnetic force in the lightest weight and most compact form with one pole of the magnet being formed at the plate 28 and the other pole at the plate 20. It should be noted that the housing including walls 12 and 14 is of a non-magnetic material. Two magnetic side plates 30 and 32, respectively, abut the magnet plate 28 and the pivot plate 20, respectively. The side plate 30 is shorter than the side plate 32 as the side plate 30 must only touch the magnet plate 28, wheres the longer side plate 32 must extend to abut the pivot plate 20. Both side plates 30 and 32 are secured to coil core 34 around which is positioned a coil and bobbin 36. The coil and bobbin 36 has a pair of wires connected to terminals 38 and 40. Fixedly secured along the top edge of the pivot plate 20 is a spring member 42. Spring member 42 is fixed at its ends through spacers 44 and 46 to the top ends of pivot plate 20. Further, at the center of spring 42 is a suitable curved indentation 48. Spring member 42 is merely a heavy linear spring fixed at both ends. The remote generator 10 has a plate 50 for receiving an eccentric trip mechanism 52 thereon. The eccentric trip mechanism 52 includes a downwardly extending pin 54 which passes through a suitable slot 56 in the plate 50 and fits within the indentation 48 in the spring 42.

The follower 60 is driven by a suitable eccentric and gear arrangement 58, the pin 54 being driven by the eccentric in accordance with the follower 60 to which it is attached. A suitable snap nut 62 holds the mechanism in place. A rubber bumper stop member 64 is fixedly secured to the bottom surface of the plate 50 to limit the rotational travel of the pivot plate 20. The eccentric and gear arrangement 58, follower 60 and pin 54 can be replaced by a gear driven cam with the cam bearing directly against the spring 42 in accordance with the principles of the present invention.

As can be seen in FIGS. 5 and 6, the remote generator 10 is designed to have its terminals 38 and 40 connected, to a suitable remote reader 66 which has a pick-up coil 68 energized by the coil 36. However, pulses to the remote reader 66 are to be read with only one pulse for each opening and closing of the magnetic circuit including the magnets 24 and 26 and the side plates 30 and 32. This is accomplished in the FIG. 5 circuit by placing a diode 72 in parallel with terminals 38 and 40. In this way, only positive going pulses will be transmitted to pick-up coil 68 and its associated circuitry.

Alternatively, as shown in FIG. 6, a diode 73 may be placed in series with the coil 68 to effect the same result.

Because of the basic operational characteristics of the pulse generator 10, the generator produces a pulse with a high peak voltage of very short duration. The total available energy produced is more than adequate to actuate an appropriate remote counter. However, the response time of these counters to build up a magnetic field sufficient to overcome mechanical inertia and resistance is longer than the duration of the generated pulse. The maximum voltage required by the counter is substantially less than the peak voltage of the generated pulse. Accordingly, a means is required to alter the form of the generated pulse to be compatible with the input requirements of the counter. This is accomplished by adding a capacitor 70 in parallel across terminals 38 and 40. By proper selection of this capacitor 70, the peak voltage output may be reduced to the level required by the counter and concurrently, the duration of the pulse increased to accommodate the response time of the counter.

The eccentric and gear mechansim 58 rotates about the fixed shaft 74 and is driven by a gear of the standard register (visual readout device) such as is commonly found on a water meter. Thus driven the eccentric portion of eccentric and gear 58 causes the follower 60 to have an oscillating motion. Pin 54, being integral with the follower 60 and restrained by the slot 56 moves in an essentially reciprocating motion from the position shown in FIG. 1 to the position in FIG. 3. In such movement, this pin 54 forces against the spring 42, moving the plate 20 about the axis 22. This breaks the magnetic circuit ordinarily formed between core 34, side plates 30 and 32, magnet plate 28, magnets 24 and 26, and pivot plate 20. When this circuit is broken, a positive pulse is generated in coil 36 and transmitted to pick up coil 68 in remote reader 66 indicating that there has been rotation of eccentric and gear mechanism 58.

When the pin 54 forces against the spring 42, the spring is extended by rotation of the drive until the force in the spring is sufficient to overcome the magnetic force and thus open the gap. This causes a large change in the réluctance of the magnetic circuit above-described, generating a pulse in the coil which is then used to drive the remote reading meter. Upon the return stroke of the eccentric, the pin 54 releases the spring 42 until the magnetic force between the magnet plates 28 and 20 and the side plates 30 and 32 returns the member to its original position. Since this is an oppositely directed change in magnetic flux, the diode 72 will prevent a signal from being transmitted to the remote meter 66. Thus, the present invention makes use of a linear force element (the spring 42 acting according to Hooke's Law and an exponential force element (a magnetic gap, closed by a radius squared force) to achieve a pulse output.

It will be observed that this is an extremely economical means for generating pulses and, further, that it requires minimal force. It should further be observed that with appropriate gearing, the number of revolutions of the basic water meter for each pulse or single revolution of the eccentric and gear 58 can be varied in accordance with the needs of the particular system in which the remote generator 10 is utilized.

The use of ceramic magnets on the pivot plate produce a light-weight plate which need only be positively forced to break the magnetic gap, but with their strength of such magnets, and their light weight, it is possible to design a system, such as is shown, in which no force need be utilized to return the pivot plate 20 back to the closed position shown in FIG. 1.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

I claim:

1. A remote generating unit comprising a magnetizable core, a coil wound around said core and having output terminals, a pivot plate, rotating mechanical drive means, a spring member mounted only on said pivot plate, said pivot plate being movable between a first position in which said pivot plate closes a magnetic circuit including said magnetizable core, and a second position in which said pivot plate opens said magnetic circuit, said rotating mechanical drive means applying a force directly to said spring member to cause said pivot plate to move from said first position to said second position upon rotation of said mechanical drive means.

2. The remote generating unit of claim 1 wherein said pivot plate is returnable to said first position by release of the force from said rotating mechanical drive means.

3. The remote generating unit of claim 1, including a remote reading unit, said remote reading unit being connected to said output terminals through a unidirectional current conducting means whereby only pulses generated by moving said pivot plate from said first position to said second position are transmitted to said remote reading unit.

4. The remote reading unit of claim 1 including at least one permanent magnet, said permanent magnet being secured to said pivot plate.

5. The remote generating unit of claim 4 wherein said pivot plate has secured a permanent magnet sandwiched between two magnetic plates, one pole of said permanent magnet being associated with one of said magnetic plates and the other pole of said permanent magnet being associated with the other magnetic plate.

6. The remote generating unit of claim 5 wherein said permanent magnet is a ceramic magnet.

7. The remote generating unit of claim 2 wherein said pivot plate has secured thereto at least one ceramic magnet, said magnetic core being positioned close enough to said pivot plate so that when said pivot plate is moved to said second position, and thence released, it will return to said first position by reason of the magnetic force between said pivot plate and said magnetizable core.

8. The remote generating unit of claim 7 wherein said pivot plate is mounted on a non-magnetic horizontal surface, one edge of said pivot plate resting in a slot on the top surface of said horizontal surface so as to be movable between said first and second positions, said pivot plate being ordinarily positioned in a substantially vertical position.

9. The remote generating unit of claim 8 wherein said rotating mechanical drive means is a continuous drive including an eccentric gear and a pin positioned in a slot to linearly move said pivot plate from said first position to said second position and to release said pivot plate when said pin returns to its initial position within its slot.

10. The remote generating unit of claim 2 wherein said spring member is a linear spring extending across the top edge of said pivot plate, said rotating mechanical drive means applying a force to said spring at the center thereof.

* * * * *

UNITED STATES PATENT OFFICE
CERTIFICATE OF CORRECTION

Patent No. 4,032,805          Dated    June 28, 1977

Inventor(s)  JOHN R. HEREFORD

It is certified that error appears in the above-identified patent and that said Letters Patent are hereby corrected as shown below:

In the ABSTRACT, the eighth line, starting with "spring is", insert the following after the word "is" and before the word "sufficient":  -- extended by rotation of the drive until the force in said spring is -- .

Column 2, Line 20, delete "wheres" and insert therefor: -- whereas -- .

Column 4, Line 29, delete "reading" and insert therefor: -- generating -- .

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*